United States Patent Office 3,403,032
Patented Sept. 24, 1968

3,403,032
PURE CULTURE FERMENTATION PROCESS FOR PICKLED CUCUMBERS
John L. Etchells and Thomas A. Bell, Raleigh, N.C., and Ralph N. Costilow, Okemos, Mich., assignors to the United States of America as represented by the Secretary of Agriculture
No Drawing. Continuation of application Ser. No. 493,936, Oct. 7, 1965, which is a continuation-in-part of application Ser. No. 324,898, Nov. 19, 1963. This application Oct. 4, 1967, Ser. No. 672,722
10 Claims. (Cl. 99—156)

ABSTRACT OF THE DISCLOSURE

A process for pickling cucumbers to produce a firm-textured, essentially acetic-acid free, fermented cucumber material containing lactic acid. The process involves heat-shocking cucumbers to destroy asporogenous micro-organism on the surface of the cucumbers as well as to inactivate deleterious heat-labile enzyme systems of plant or microbial origin, packing the heat-shocked cucumbers in aseptic containers and covering them with brine of a strength to give en equilibrated salt concentration of about 1.6% to 10% by weight, inoculating the containers with a selected species of pure culture lactic acid fermentation-inducing micro-organisms, sealing the containers, and incubating them at a temperature favorable for growth of the introduced pure culture micro-organisms until the fermentation has progressed to completion.

---

This application is a continuation of application bearing Ser. No. 493,936, filed Oct. 7, 1965, now abandoned which, in turn, is a continuation-in-part of application bearing Ser. No. 324,898, filed Nov. 19, 1963, now abandoned.

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for the pure culture fermentation of vegetables, particularly cucumbers, by selected pure cultures of lactic acid producing bacteria.

As used herein, the term "vegetables" includes cucumbers, carrots, green tomatoes, peppers, onions, okra, snap beans, West Indian gherkins, and the like. Because of their wide use in the food field, "cucumbers" or "cucumbers for pickles" will frequently be used below as "the vegetable."

It is well known that the conventional centuries old process for the brine curing of vegetables, such as cucumbers for pickles, involved brining of the cucumbers and subsequent fermentation induced by micro-organisms normally extant on the cucumbers or other vegetables and transient micro-organisms introduced by virtue of processing operations; the type and number of micro-organisms present in the brine being limited only by the ability of each to survive the conditions of brining. The success of this natural, mixed microbial flora fermentation process depends completely upon chance and the skills of those practicing the art of brine curing in establishing environmental conditions favorable for the growth of the lactic acid producing bacteria. A major and costly difficulty in the natural fermentation process is the frequent ascendency of non-lactic acid producing bacteria, yeasts, molds and other fungi. This ascendency results in a fermentation which is abnormal to the one desired, and usually gives rise to such kinds of deteriorative conditions as softening, hollow cucumbers, bleaching, putrefaction, and to other unpalatable and unappetizing changes.

Herein is reported the invention of a new, novel, and practical process for the brine fermentation and curing of vegetables, such as cucumbers, which enables scientific control of the fermentation thereby decreasing the chances of brine-stock loss and giving rise to finished products of unusually high quality and controlled characteristics.

It is accordingly an object of this invention to provide a vegetable brine curing process in which the frequency of abnormal fermentations is reduced or eliminated by the attenuation, destruction, or removal of the natural and introduced mixed flora which give rise to abnormal fermentations, and by supplanting these undesirable microbial species with pure cultures of one or more bacterial species of strains selected from the genera Lactobacillus, Pediococcus, and Leuconostoc.

Another object of this invention is to provide a vegetable brine curing process in which the desirable characteristics of the processed product may be predicted. This is accomplished by knowing the biochemical properties and fermentative behavior of a selected strain or a mixture of selected strains of lactic acid producing bacteria employed in the pure culture process. Our selection studies first revealed that specific fermentation differences affecting brine-stock vegetable quality were obtained not only between individual species of lactic acid bacteria but also between strains of the same species. For example, a decided difference in color and odor of brine-stock was obtained with certain strains of the species Pediococcus cerevisiae. Some gave the brine a stale, hay-like odor and the vegetables revealed an off-color, with evidence of bleaching. As the result of the above important findings, screening tests involving several hundred pure culture fermentations were carried out using over 50 individual cultures of lactic acid bacteria representing 10 species in 3 genera, namely: Lactobacillus bulgaricus, L. brevis, L. delbrueckii, L. fermenti, L. helveticus, L. lactis, L. plantarum, L. thermophilus; Pediococcus cerevisiae; and Leuconostoc mesenteroides.

By virtue of these extensive screening tests, final selection of the most desirable strains of lactic acid bacterial species for use in vegetable fermentations was accomplished. Criteria used in the selection of a given strain included: color, odor, flavor and texture of the fermented vegetable, such as, pickles; absence of bloaters; utilization of brine sugars, rate of development of brine acidity; final brine acidity and pH; salt and acid tolerance of the culture; temperature range and tolerance of the culture; and viability and longevity of the culture. The cultures selected in their approximate rank order of desirability were: Lactobacillus plantarum (4 strains); Pediococcus cerevisiae (2 strains); Lactobacillus delbrueckii (3 strains); Lactobacillus lactis (1 strain); Lactobacillus thermophilus (1 strain); and Leuconostoc mesenteroides (2 strains).

All 10 strains of the species Lactobacillus brevis produced bloaters in pickles, even in combination with one or more cultures of non-gas-forming species and with but ⅒ of their inoculum. This undesirable property of L. brevis would probably preclude its use in pure culture pickle fermentation even in bulk unless pierced or pricked cucumbers were used. Essentially the same would be true for the species L. fermenti. The two remaining species of the 10 tested, L. bulgaricus and L. helveticus, failed to grow in vegetables, such as cucumbers, brined at 4% to 5% salt.

A still further object of this invention is to provide a new and novel process for manufacturing pickled vegetable products in the retail and wholesale containers as well as in bulk for reprocessing as pasteurized vegetable products and for use as brine-stock pickles in the manufacture of conventional processed pickled products.

A still further object of this invention is to provide new and novel types of fermented vegetable products in which the firmness (texture) remains substantially that of the starting vegetable material, and which is essentially acetic acid-free and contains lactic acid.

The new process as applied to the manufacture of pure culture pickled vegetables such as cucumber pickles involves:

(1) Harvesting, sizing, and washing the vegetables.

(2) Subjecting the vegetables to a heat shocking or continuous blanching operation which step amounts to a surface sanitization. The vegetables are subjected to the heat shocking treatment by completely immersing them, in bulk, in a water bath, or putting them through a suitably-modified continuous hot water blancher until the internal temperature reaches 145° to 150° F. For cucumbers of commercial grade size 1B (⅞ to 1 1/16 inch diameter) or other vegetables of similar size, the temperature and time requirements are in the order of 170° F. for 3 to 5 minutes. The temperature and time factors will, of course, vary for the different size vegetables to avoid excessive heating (see Table I). This is particularly true for the continuous heating operation using a rotary hot water blancher. Here the rate of travel of the cucumbers or other vegetables through the machine and the temperature of the blanching water during operation must be calibrated for each vegetable size used and necessary adjustments made to insure that the internal temperature of the heated vegetables reaches the recommended range (145° to 150° F.). Furthermore, the vegetable material must be kept completely submerged during the heat-shocking treatment. For vegetable sizes exceeding 1½ inches in diameter, the calculated immersion time given in Table I can be reduced by preheating such material to about 110° F. For example, preheated size 3 cucumbers, or carrots, and green tomatoes of this diameter (1½–2 inches), would then receive the immersion time given in Table I for 2B size. This is particularly important in mixed vegetable packs where certain of the vegetables used may be of a larger diameter than others. The heat-shocking treatment is highly effective in substantially destroying vegetative micro-organisms, particularly the asporogenous species normally found on the untreated vegetables in great numbers (i.e., about 200 million present on a 1 inch diameter cucumber) and considered as interfering and competitive contaminants in the pure culture fermentation process. Also, the heat-shocking-treatment inactivates or attenuates certain deleterious heat-labile enzyme systems of plant or microbial origin associated with cucumbers and other vegetables which, if present in sufficient concentrations, could otherwise cause deterioration of the texture, color, flavor, and odor of the fermented product.

TABLE I

| Size of Cucumber | | Water Temp., degrees F. | Time of Immersion, minutes |
|---|---|---|---|
| (Commercial Designation) | (Diameter, inches) | | |
| 1A | Up to ⅞ | 170–172 | 3. |
| 1B | ⅞–1 1/16 | 170–172 | 3–5. |
| 2A | 1 1/16–1 5/16 | 170–172 | 5–7. |
| 2B | 1 5/16–1½ | 170–172 | 7–10. |
| 3 [1] | 1½–2 | 170–172 | 10–15. |
| 4 [1] | Over 2 | 170–172 | 15–20. |

[1] Preheat to about 110° F. and use the immersion time given for size 2B (3) Draining and packing the heat-shocked vegetables in sanitized containers with sanitized closures. The term "sanitized" is employed as being descriptive of a container and its closure that have received conventional washing and then rinsing with a chlorine solution of sufficient strength to destroy the asporogenous microbes, plus the normal careful handling that is exercised in the care of food containers intended for human use.

(4) Covering the packed vegetables in the sanitized containers with a concentration of salt (sodium chloride) brine which will equilibrate to approximately 1.6% to 10% by weight and which brine has been previously heated to 175° to 180° F. to destroy asporogenous microorganisms and then cooled to such a temperature level (about 40–45° F.) that the total pack (i.e., heat-shocked vegetables, plus brine and container) will equilibrate out within the desired temperature range of the particular strain or species of lactic acid organisms chosen for the fermentation. For pure culture brine stock vegetables that are to be used for manufacture of various processed pickled products, cover brines equilibrating in the range of 5% to 8% by weight are used.

(5) Adding an inoculum of selected pure culture lactic acid producing bacteria in the form of either dried pellets, dried granules, dried powder, or broth to each of the containers, the micro-organisms being introduced in a quantity the order of magnitude of which is about 1,000,000,000 viable cells per quart of the packed and brined vegetables.

It is advantageous in the case of slow growing species and strains to add, prior to inoculation, a sufficient quantity of food grade, edible lactic or acetic acids or vinegars to reduce the equilibrated brine pH to within the 4.6 to 4.2 range to favor the growth of the introduced lactic acid producing bacteria and greatly retard or completely inhibit the growth of the spore-forming types that survive the heat-shocking treatment. A brine pH of about 4.5 is a good practice.

(6) Adding dill weed, oil of dill, garlic (either fresh or as the essential oil), and/or other pickling spices or essential oils to give desired flavor characteristics to the finished product. The addition of the above spices and flavorings is optional, but if used they must be carefully sanitized to rid them of any competitive and interfering asporogenous microbial groups. Essential oils (dill, garlic, etc.) can best be sanitized by emulsifying, using conventional methods directly in the cover brine prior to heating and cooling the brine, as described earlier (Par. 4). For pure culture brine-stock pickles, or for pickles destined for use as fresh pack products the spices and flavorings are omitted.

(7) Hermetically sealing the containers with sanitized closures and incubating them at ambient temperature, room temperature, or preferably at the temperature which is optimum for the lactic acid producing bacterial species selected. The growth of the pure culture organism, introduced just prior to sealing of the containers, progresses for a period of several days after which time the fermentation of the vegetables is substantially complete and the activity of the pure culture organism subsides and finally ceases altogether. The fermented product, which is a firm-textured, essentially acetic acid-free, fermented cucumber, or other vegetable, material containing lactic acid, is ready for use in 3 to 4 days but improves with age through several months.

As a practical demonstration of the pure culture process, 144 fermentations including controls were carried out in standard quart jar containers. The freshly harvested pickling cucumbers, graded Size 1A (up to ⅞ inch diameter), were given a water wash primarily for the purpose of removing field debris and dirt and were then subjected to a heat shocking treatment that consisted of immersing the cucumbers in water at a temperature of 170° F. for a period of five minutes at which time the internal temperature of the cucumbers had reached 148° to 150° F. The heat-shocked cucumbers were then drained, packed in glass containers, and covered with brine of concentration of 7.8% salt by weight, which equilibrated at 3.0% to 3.5% and which contained an emulsion of oil of dill and garlic concentrate. The previously prepared brine had been boiled and cooled to approximately 40° to 45° F.

One and one-fourth milliliters of 85% lactic acid were added to each container to reduce the pH of the brine to about pH 4.6.

Just before sealing each container, two pellets (approximately 1 billion viable cells) of a freeze-dried culture of *Lactobacillus plantarum* were added in one-third the containers; pellets of *Pediococcus cerevisiae* in like amount were added to one-third the containers; and the remaining one-third of the containers, exclusive of controls, received two pellets each of both species of lactic acid bacteria. All the containers were sealed and allowed to incubate at 90° F. for 72 hours then placed at room temperature. At the end of 24 hours' incubation, a good growth of micro-organisms had occurred as judged by the visible turbidity within the inoculated containers. After a period of 48 hours a luxuriant growth of the micro-organisms was apparent as evidenced by the presence of marked turbidity in every container except the heat shocked, uninoculated controls which showed no evidence of microbial activity as judged by the absence of brine turbidity. The growth of the pure culture organism will continue to progress at room temperature for a period of several days after which time the fermentation of the cucumbers is substantially complete and the activity of the pure culture organism subsides, the cells settle to the bottom of the container, the brine then becomes clear and growth and further acid development finally cease altogether. The fermentation process which is the subject of this invention is self-limited.

This lot of 144 jars of pure culture fermented pickles (including controls), prepared as described above, was divided so that one-third of the jars were evaluated after each of three storage periods; these were, five, seven, and 18 months' storage at room temperature. The judging was done by experienced personnel of a commercial pickle processing plant on a rating scale of 1 to 10 with the highest value representing the most acceptable product. Rating scores were based on odor, flavor, appearance, texture, absence of bloaters, and the like. In all instances the pure culture fermented products scored 7 to 9 (*good-excellent*) out of a possible 10 rating. The ratings for pickles stored 18 months were slightly higher (8–9) than those given for pickles stored 5 and 7 months. The natural controls received a rating of 1 (*not acceptable*) because of an undesirable off odor and flavor and a high percentage of bloaters (90%).

Numerous pure culture pickle or other vegetable fermentations have been executed by us at substantially higher salt brine concentrations than those described in the foregoing practical demonstration. Equalized brine strengths ranging from 0% to 20% with respect to sodium chloride have been thoroughly tested using Size 1B heat shocked pickling cucumbers inoculated singly with cultures of 3 species of lactic acid bacteria, namely, *Lactobacillus plantarum*, *Lactobacillus brevis* and *Pediococcus cerevisiae*.

In fermentations using medium strength salt brine (6–7%) all cultures grew well and reached populations of 30 to 680 million viable cells per milliliter of brine after 40 hours' incubation at 90° F. Final brine acidities reached 0.45 to 0.50% (calculated as lactic) for the cultures of *Pediococcus cerevisiae* and *Lactobacillus brevis* with brine pH's in the range of 3.75 to 3.40. Acid production by strains of *Lactobacillus plantarum* was higher, ranging from 0.70% to 0.95% with brine pH's in the range of 3.35 to 3.20. It was clearly demonstrated that pure culture cucumber fermentations at increasingly higher salt brine strengths, such as from 2% to upwards of 10%, resulted in the production of correspondingly lower amounts of brine acidity. The upper limit for appreciable growth and measurable acid production, for the above named lactic species, was between 8 and 10% salt.

*Pediococcus cerevisiae* was the most salt tolerant of the 3 lactic species tested and grew appreciably in brines containing upwards of 12% salt but produced little or no acid. This species was followed in salt tolerance by *Lactobacillus plantarum* and *Lactobacillus brevis* in the order named. All strains tested of the latter species, which is a gas-forming lactic, produced bloated (hollow) cucumbers at all brine strengths where it was capable of developing substantial cell populations and accompanying carbon dioxide gas. No bloaters were produced by any of the cultures of the 2 non-gas-forming species, *Lactobacillus plantarum* and *Pediococcus cerevisiae*.

In addition, pure culture fermentations have been carried out similar to those described above, but with the variation that consists of utilizing combinations or mixtures in different proportions of two or more pure culture organisms to carry out the fermentations in brine. The mixed culture bacterial fermentations progressed as well as did the single species fermentations but with the added advantage that certain flavor characteristics can be accentuated or attenuated by use of particular mixtures of cultures. In addition, with a two species mixture such as *Ped. cerevisiae* and *L. plantarum*, the first named species insures prompt initiation of rapid growth and accompanying acid production and is then replaced by active development of the second species which completes the acid fermentation.

In another practical demonstration, various types of vegetables were packed in various types of containers. These vegetables were washed, heat-shocked, packed in chlorine sanitized containers and covered with a previously heated and cooled brine. In all the illustrations to follow under Series A–F, inclusive, a 22° salometer cover brine (5.8% salt by weight) was used. Also, the brine contained an emulsion of oil of dill except for Series F fermentations where it was omitted.

Certain chemical tests, necessary for charting the nature and progress of fermenting activity of the brined vegetables, illustrated herein, were made on brine samples removed aseptically from the various containers. For fermentations reported as examples under Series A–C, these tests were made at several intervals during the first 37 days and then after a storage period of 5 months (150 days); such tests were then terminated and product quality ratings made. For fermentations given as examples under Series D–F, the chemical tests were run on brine samples only at the conclusion of the 5-month storage period, coincident with product quality ratings.

The brines from all fermentations presented as examples under Series A–F (to follow) were examined microscopically (using 1500× magnification) at 5 months to determine the predominating microbial cell types present.

SERIES A

Whole cucumbers, 28 lots, packed in sanitized No. 10 tin cans.—All inoculated cans received four sanitized garlic cloves and were acidified with 5 ml. of 85% lactic acid. Half of the containers in each inoculated and control group received 15–20 grams of mixed spices contained in each of two small cotton bags which were sanitized by immersion in 70% ethanol. The 28 cans were divided into six groups of two to six cans each and handled as follows regarding their inoculation and control treatments:

Examples 1–6

|  | Cans |
|---|---|
| (1) Inoculated with *L. plantarum* No. 15 | 6 |
| (2) Inoculated with *Ped. cerevisiae* No. 39 | 6 |
| (3) Inoculated with a mixture of Cultures No. 15 and No. 39 | 6 |
| (4) Inoculated with *L. brevis* No. 70 | 2 |
| (5) Uninoculated, natural controls: | |
| (a) Nonacidified, pH 6.0 | 2 |
| (b) Acidified, pH 4.4 | 2 |
| (6) Uninoculated, heat-shocked controls: | |
| (a) Nonacidified, pH 6.0 | 2 |
| (b) Acidified, pH 4.3 | 2 |

The results for Series A fermentations, Examples 1–6, follow: (In each series of vegetable fermentations described herein (Series A–F), the tests for pickle quality were determined after 5 months' storage by panels of qualified judges; the quality ratings reported are the findings of these panels.)

(1) *L. PLANTARUM* NO. 15 [1]

| | Time (days) | | | |
|---|---|---|---|---|
| | 0.5 | 10 | 37 | 150 |
| Analysis of Brine Samples: | | | | |
| Acidity as lactic acid (percent) | 0.19 | 0.8 | 0.90 | 0.93 |
| pH | 4.25 | 3.4 | 3.4 | 3.4 |
| Salt content (percent) | 2.8 | 2.6 | 2.6 | |
| Reducing Sugars (percent) | 0.93 | | | 0.28 |
| Quality Ratings at 5 months: | | | | |
| Appearance | | | | Good |
| Flavor | | | | Good |
| Texture | | | | Good |
| Bloaters | | | | None |
| Cell types after 150 days | | | | Only cells typical of *L. plantarum* |

[1] In this and all other examples shown herein under Series A–F, the cover brine equalized with the water content of the vegetable in about 24 hours and the salt content values remained constant (±0.1%) thereafter.

A panel of 29 judges rated this product *good* as to overall acceptability for commercial use.

(2) *PED. CEREVISIAE* NO. 39

| | Time (days) | | | |
|---|---|---|---|---|
| | 0.5 | 10 | 37 | 150 |
| Analysis of Brine Samples: | | | | |
| Acidity as lactic acid (percent) | 0.172 | 0.43 | 0.46 | 0.48 |
| pH | 4.3 | 3.7 | 3.7 | 3.75 |
| Salt content (percent) | 2.6 | 2.5 | | |
| Reducing sugars (percent) | 0.93 | | 0 | 0.65 |
| Quality Ratings at 5 months: | | | | |
| Appearance | | | | Good |
| Flavor | | | | Good |
| Texture | | | | Good |
| Bloaters | | | | None |
| Cell types after 150 days | | | | Only cells typical of *Ped. cerevisiae* No. 39 |

A panel of 29 judges gave this product a rating of *good* as to overall commercial acceptability.

(3) *L. PLANTARUM* NO. 15, AND *PED. CEREVISAE* NO. 39 (MIXTURE)

| | Time (days) | | | |
|---|---|---|---|---|
| | 0.5 | 10 | 37 | 150 |
| Analysis of Brine Samples: | | | | |
| Acidity as lactic acid (percent) | 0.196 | 0.43 | 0.98 | 1.02 |
| pH | 4.3 | 3.8 | 3.3 | 3.35 |
| Salt content (percent) | 2.7 | 2.5 | | |
| Reducing sugars (percent) | 0.93 | | | 0.08 |
| Quality Ratings at 5 months: | | | | |
| Appearance | | | | Good |
| Flavor | | | | Good |
| Texture | | | | Good |
| Bloaters | | | | None |
| Cell types after 150 days | | | | Cells typical of *L. plantarum* No. 15, and *Ped. cerevisiae* No. 39. No other cell types observed. |

A panel of 29 judges gave this product a rating of *good* for overall acceptability for commercial use.

(4) *L. BREVIS* NO. 70

After 5 months' storage the pickles made with this species were examined and judged by a panel of 6 judges to be unacceptable because of high bloater (hollow pickles) content (62%) and poor flavor and odor.

(5) UNINOCULATED, NATURAL CONTROLS

A panel of 6 judges found both the nonacidified (5a) and the acidified (5b) lots in this group unacceptable because of high bloater content (67–70%) and bitter, unclean, undesirable flavor. These fermentations contained a heterogeneous flora of microbial cells.

(6) UNINOCULATED, HEAT-SHOCKED CONTROLS

The nonacidified lots (6a) in this control group were rated as unacceptable by the panel (6 judges); this rating resulted from a malodorous butyric acid odor and 88% bloaters. In contrast, the acidified lots (6b) were free of microbial development because the heat-shocking treatment was effective in destroying competitive and interfering asporogenous micro-organisms and the acidification treatment prevented development of heat resistant sporeforms. The judges rated these pickles (6b) as *poor* because of too bland a flavor (low acidity, about 0.20% as lactic acid).

SERIES B

Whole cucumbers, 10 lots packed in sanitized one-gallon glass jars.—The procedure for brining, acidification, garlic addition, and spicing for this series was the same as given for Series A, except only one spice bag (15–20 grams) was used per jar and the acidification was increased from 5 ml. to 6 ml. of lactic acid per container. The 10 jars were divided into five groups of two jars each and their inoculation and control treatments were as follows:

Examples 1–5

(1) Inoculated with *L. plantarum* No. 15
(2) Inoculated with *Ped. cerevisiae* No. 39
(3) Inoculated with a mixture of cultures No. 15 and No. 39
(4) Uninoculated, natural controls (acidified)
(5) Uninoculated, heat shocked control (acidified)

The results follow for Series B, Examples 1–5:

(1) *L. PLANTARUM* NO. 15

| | Time (days) | | | |
|---|---|---|---|---|
| | 0.75 | 10 | 36 | 150 |
| Analysis of Brine Samples: | | | | |
| Acidity as lactic acid (percent) | 0.21 | 0.87 | 1.05 | 1.12 |
| pH | 4.4 | 3.5 | 3.3 | 3.4 |
| Salt content (percent) | 2.3 | 2.2 | | |
| Reducing sugars (percent) | 1.02 | | | 0.07 |
| Quality Ratings at 5 months: | | | | |
| Appearance | | | | Good |
| Flavor | | | | Good |
| Texture | | | | Good |
| Bloaters | | | | None |
| Cell types after 150 days | | | | Only cells typical of *L. plantarum* No. 15. |

A panel of 17 judges rated this product *good* as to overall commercial acceptability.

(2) *PED. CEREVISIAE* NO. 39

| | Time (days) | | | |
|---|---|---|---|---|
| | 0.75 | 10 | 36 | 150 |
| Analysis of Brine Samples: | | | | |
| Acidity as lactic acid (percent) | 0.21 | 0.50 | 0.54 | 0.57 |
| pH | 4.4 | 3.8 | 3.7 | 3.75 |
| Salt content (percent) | 2.4 | 2.1 | | |
| Reducing sugars (percent) | 1.02 | | | 0.58 |
| Quality Ratings at 5 months: | | | | |
| Appearance | | | | Good |
| Flavor | | | | Fair–good |
| Texture | | | | Good |
| Bloaters | | | | None |
| Cell types after 150 days | | | | Only cells typical of *Ped. cerevisiae* observed. |

A panel of 17 judges rated this product *fair–good* as to overall commercial acceptability.

(3) *L. PLANTARUM* NO. 15 AND *PED. CEREVISIAE* NO. 39 (MIXTURE)

| | Time (days) | | | |
|---|---|---|---|---|
| | 0.75 | 10 | 36 | 150 |
| Analysis of Brine Samples: | | | | |
| Acidity as lactic acid (percent) | 0.18 | 0.50 | 1.04 | 1.08 |
| pH | 4.45 | 3.7 | 3.35 | 3.4 |
| Salt content (percent) | 2.5 | 2.4 | | |
| Reducing sugars (percent) | 1.02 | | | 0.01 |
| Quality Ratings at 5 months: | | | | |
| Appearance | | | | Good |
| Flavor | | | | Good |
| Texture | | | | Good |
| Bloaters | | | | None |
| Cell types after 150 days | | | | Only cells typical of *L. plantarum* No. 15 and *Ped. cerevisiae* No. 39 observed. |

A panel of 6 judges was used in making the quality ratings and they rated this lot *good* as to overall commercial acceptability.

(4) UNINOCULATED, NATURAL CONTROLS
(ACIDIFIED)
and
(5) UNINOCULATED, HEAT-SHOCKED CONTROLS
(ACIDIFIED)

A panel of 6 judges found both sets of controls for this series to be unacceptable for commercial use. The natural controls (4) were down-graded chiefly because of high bloater content (57 and 72%). The heat shocked controls (5) were judged unacceptable because of poor flavor (too bland). The latter controls remained free of microbial development for several months with no change in brine acidity over that added initially (about 0.20% as lactic acid).

SERIES C

Quartered cucumbers (spears), six lots packed in sanitized one-gallon glass jars.—The procedure as to brining, acidification, garlic addition and spicing was the same as given under Series B. The spears were made by quartering heat-shocked cucumbers lengthwise, packing promptly in the containers and then adding the cover brine. Because this series was run simultaneously with Series B, no additional controls were prepared. The six jars were divided into three sets of two jars each and their inoculation treatments follow:

Examples 1–3

(1) Inoculated with *L. plantarum* No. 15
(2) Inoculated with *Ped. cerevisiae* No. 39
(3) Inoculated with a mixture of cultures No. 15 and No. 39

The results follow for Series C, Examples 1–3:

(1) *L. PLANTARUM* NO. 15

|  | Time (days) | | | | |
|---|---|---|---|---|---|
|  | 0.75 | 3 | 10 | 36 | 150 |
| Analysis of Brine Samples: | | | | | |
| Acidity as lactic acid (percent) | 0.18 | 0.45 | 0.72 | 1.18 | 1.21 |
| pH | 4.60 | 3.8 | 3.55 | 3.30 | 3.35 |
| Salt content (percent) | 1.8 | 1.8 | 1.9 | | |
| Reducing sugars (percent) | 1.20 | | | | 0.01 |
| Quality Ratings at 5 months: | | | | | |
| Appearance | | | Good | | |
| Flavor | | | Good | | |
| Texture | | | Good | | |
| Bloaters | | | Not applicable to spears | | |
| Cell types after 150 days | | | Only cells typical of *L. plantarum* No. 15 | | |

A panel of 17 judges rated this product *good* as to overall commercial acceptability.

(2) *PED. CEREVISIAE* NO. 39

|  | Time (days) | | | | |
|---|---|---|---|---|---|
|  | 0.75 | 3 | 10 | 36 | 150 |
| Analysis of Brine Samples: | | | | | |
| Acidity as lactic acid (percent) | 0.34 | 0.43 | 0.56 | 0.59 | 0.62 |
| pH | 4.0 | 3.9 | 3.8 | 3.7 | 3.7 |
| Salt content (percent) | 1.6 | 1.6 | 1.6 | | |
| Reducing sugars (percent) | 1.2 | | | | 0.57 |
| Quality Ratings at 5 months: | | | | | |
| Appearance | | | Good | | |
| Flavor | | | Fair | | |
| Texture | | | Good | | |
| Bloaters | | | Not applicable to spears | | |
| Cell types after 150 days | | | Only cells typical of *Ped. cerevisiae* No. 39 | | |

Two panels, one of six and one of 17 judges rated this product *good* as to overall commercial acceptability and the spears had good firmness.

(3) *L. PLANTARUM* NO. 15 AND *PED. CEREVISIAE* NO. 39 (MIXTURE)

|  | Time (days) | | | | |
|---|---|---|---|---|---|
|  | 0.75 | 3 | 10 | 36 | 150 |
| Analysis of Brine Samples: | | | | | |
| Acidity as lactic acid (percent) | 0.20 | 0.42 | 0.58 | 1.15 | 1.20 |
| pH | 4.3 | 3.8 | 3.7 | 3.3 | 3.4 |
| Salt content (percent) | 1.8 | 1.8 | 1.8 | | |
| Reducing sugars (percent) | 1.20 | | | | 0.01 |
| Quality Ratings at 5 months: | | | | | |
| Appearance | | | Good | | |
| Flavor | | | Good | | |
| Texture | | | Good | | |
| Bloaters | | | Not applicable to spears | | |
| Cell types after 150 days | | | Only cells typical of *L. plantarum* No. 15 and *Ped. cerevisiae* No. 39 observed | | |

A panel of 6 judges was used in making the quality ratings and they rated this lot *good* as to overall commercial acceptability. The spears had good firmness.

Controls.—All controls were commercially unacceptable as reported under Series B, Examples (4) and (5).

SERIES D

Mixed vegetables, six lots, packed in half-gallon glass jars.—In this series, approximately equal quantities of carrots (sliced lengthwise), cucumbers (whole and quartered lengthwise), green tomatoes (halves), and hot, red and green cherry peppers were packed in each container and brined. Each jar also received 3 ml. of 85% lactic acid, and four garlic cloves; no other spices were added. The inoculation treatment for all jars was as follows:

Example 1

(1) Inoculated with a mixture of *L. plantarum* No. 15 and *Ped. cerevisiae* No. 39 (six jars)

The results follow for Series D, Example 1 consisting of 6 replications that received the two species inoculation:

(1) *L. PLANTARUM* NO. 15 AND *PED. CEREVISIAE* NO. 39 (MIXTURE)

|  | Results at 150 days for Jar No.— | | | | | |
|---|---|---|---|---|---|---|
|  | 1 | 2 | 3 | 4 | 5 | 6[1] |
| Analysis of Brine Samples: | | | | | | |
| Acidity as lactic acid (percent) | 1.68 | 1.90 | 1.63 | 1.66 | 1.82 | 0.53 |
| pH | 3.3 | 3.3 | 3.3 | 3.3 | 3.3 | 3.8 |
| Salt (percent) | 1.9 | 1.6 | 2.1 | 2.5 | 2.0 | 2.5 |
| Reducing sugars (percent) | 1.01 | 0.70 | 0.84 | 0.074 | 0.85 | 1.40 |
| Quality Ratings at 5 months: | | | | | | |
| Appearance | Good | | | | | |
| Flavor | Good | | | | | |
| Texture | Good | | | | | |
| Bloaters | None in cucumbers; not applicable to other vegetables | | | | | |

[1] Jar refrigerated at 40° F. during storage.

Cell types after 150 days: Two cell types present; these were typical of *L. plantarum* No. 15 and *Ped. cerevisiae* No. 39. No other cell types noted.

A panel of 20 judges rated this product *good* as to overall acceptability for commercial use.

SERIES E

Green tomatoes (whole), 13 lots packed in sanitized half-gallon glass jars.—The packed jars were brined without the addition of lactic acid because the natural acids of the green tomatoes produced a brine acidity of about 0.40% (calculated as lactic) with a pH of 4.3. Eleven of the jars were inoculated (1–11 as listed below); of these, the first 5 (1–5) received no further treatment as to spicing or garlic addition. The remaining inoculated lots (6–11) received one spice bag (15–20 grams) and four garlic cloves each. The two uninoculated controls received no further treatment. The 13 inoculation and control treatments, representing single jar lots, follow:

Examples 1–3

(1) Inoculated with *L. plantarum* No. 442
(2) Inoculated with *L. plantarum* No. 12
(3) Inoculated with *L. plantarum* No. 15
(4) Inoculated with *Ped. cerevisiae* No. 39
(5) Inoculated with *Ped. cerevisiae* No. 61
(6) Inoculated with *L. brevis* No. 70
(7) Inoculated with a mixture of cultures Nos. 12 and 39
(8) Inoculated with a mixture of cultures Nos. 15 and 61
(9) Inoculated with a mixture of cultures No. 442 and No. 39
(10) Inoculated with *L. brevis* No. 50
(11) Inoculated with a mixture of cultures No. 12 and No. 61
(12) Uninoculated, natural control
(13) Uninoculated, heat shocked control The results follow for Series E, Examples 1–13: Certain chemical changes induced by the pure culture fermentation of brined green tomatoes by cultures of three species of lactic acid bacteria are summarized in Table II.

TABLE II.—PURE CULTURE FERMENTATION OF BRINED GREEN TOMATOES

| Examples 1-13 | Culture Used | | Analysis of Brine Samples at 5 Months | | | |
|---|---|---|---|---|---|---|
| | Species [1] | No. | Acidity as Lactic Acid, Percent | pH | Salt, Percent | Reducing Sugars, Percent |
| (1) | LP | 442 | 1.27 | 3.5 | 3.0 | 0.28 |
| (2) | LP | 12 | 1.44 | 3.4 | 2.7 | 0.36 |
| (3) | LP | 15 | 1.39 | 3.4 | 3.1 | 0.34 |
| (4) | PC | 39 | 0.65 | 3.9 | 2.7 | 1.14 |
| (5) | PC | 61 | 0.76 | 3.8 | 2.7 | 0.81 |
| (6) | LB | 70 | 1.16 | 3.8 | 2.6 | 0.14 |
| (7) | LP+PC | 12+39 | 1.38 | 3.5 | 2.5 | 0.69 |
| (8) | LP+PC | 15+61 | 1.46 | 3.5 | 2.9 | 0.45 |
| (9) | LP+PC | 442+39 | 1.40 | 3.5 | 2.6 | 0.79 |
| (10) | LB | 50 | 0.85 | 3.8 | 2.9 | 0.01 |
| (11) | LP+PC | 12+61 | 1.37 | 3.5 | 2.7 | 0.66 |
| (12) | Natural Control | | 0.52 | 4.2 | 2.9 | 0.26 |
| (13) | Heated Control | | 0.41 | 4.3 | 2.8 | 1.27 |

[1] LP = L. plantarum; PC = Ped. cerevisiae; LB = L. brevis.

Preliminary evaluation of the brined tomato samples after about 5 months indicated that L. plantarum (Nos. 12, 15 and 442) and mixtures of this species and Ped. cerevisiae (Nos. 39 and 61) gave products of good quality which were well acidified and with brine pH's of 3.4–3.5 (see Table II). Ped. cerevisiae alone gave weak to poor fermentations with brine acidities only slightly higher than the heat shocked, unfermented control. Both cultures of L. brevis produced a very vigorous gaseous fermentation and the products made with this species were judged commercially unacceptable. The natural control also underwent a vigorous, gaseous fermentation and the resulting product was commercially unacceptable. The heat shocked control remained free of microbial development, demonstrating that this treatment in combination with the natural acidity from the green tomato fruit was effective in completely controlling competing and interfering micro-organisms in the brined product throughout the 5-month storage period.

It will be observed from the above results that the omission of lactic acid in the brine prior to sealing the jars still results in a commercially acceptable product when L. plantarum, or mixtures of L. plantarum and Ped. cerevisiae are used.

SERIES F

Hot cherry peppers, 10 lots packed in sanitized half-gallon glass jars.—In this series, the packed jars were brined and received *no* further treatment as to acidification, spicing or garlic addition. The 10 inoculation and control treatments, representing single jars each, were as follows:

Examples 1–10

(1) Inoculated with L. plantarum No. 442
(2) Inoculated with L. plantarum No. 12
(3) Inoculated with L. plantarum No. 15
(4) Inoculated with Ped. cerevisiae No. 61
(5) Inoculated with L. brevis No. 70
(6) Inoculated with a mixture of culture No. 12 and Ped. cerevisiae No. 39
(7) Inoculated with a mixture of cultures Nos. 15 and 61
(8) Inoculated with a mixture of culture No. 442 and Ped. cerevisiae No. 39
(9) Uninoculated, natural control
(10) Uninoculated, heat shocked control The results for Series F, Examples 1–10 follow: Information is summarized in Table III on certain chemical changes in the brine resulting from the pure culture fermentation of cherry peppers by several cultures of three species of lactic acid bacteria.

TABLE III.—PURE CULTURE FERMENTATION OF BRINED CHERRY PEPPERS

| Examples 1-10 | Culture Used | | Analysis of Brine Samples at 5 Months | | | |
|---|---|---|---|---|---|---|
| | Species [1] | No. | Acidity as Lactic Acid, Percent | pH | Salt, Percent | Reducing Sugars, Percent |
| (1) | LP | 442 | 1.19 | 3.5 | 2.6 | 0.64 |
| (2) | LP | 12 | 1.28 | 3.4 | 2.7 | 0.55 |
| (3) | LP | 15 | 1.34 | 3.4 | 2.9 | 0.55 |
| (4) | PC | 61 | 0.66 | 3.70 | 2.7 | 1.14 |
| (5) | LB | 70 | 0.94 | 3.70 | 2.7 | 0.20 |
| (6) | LP+PC | 12+39 | 1.22 | 3.40 | 2.9 | 0.47 |
| (7) | LP+PC | 15+61 | 1.32 | 3.40 | 2.7 | 0.59 |
| (8) | LP+PC | 442+39 | 1.17 | 3.50 | 2.8 | 0.59 |
| (9) | Natural Control | | 1.11 | 3.70 | 3.2 | 0.03 |
| (10) | Heated Control | | 0.30 | 4.40 | 2.9 | 1.64 |

[1] LP = L. plantarum; PC = Ped. cerevisiae; LB = L. brevis.

Preliminary evaluation of the brined pepper samples after about five months indicated that fermentations using cultures of L. plantarum or mixtures of this species and Ped. cerevisiae gave products of good quality which were well acidified and free of undesirable flavor and texture changes. Products made with L. brevis underwent a vigorous gaseous fermentation and were judged to be commercially unacceptable. The same was true for the natural and heated controls. Inasmuch as brined material in this series was *not* acidified, it is understandable that the heat shocked control developed some growth by heat-resistant spores in the nonacidified brine. However, in the inoculated series, the cultures of lactic acid bacteria grew promptly and rapidly lowered the brine pH. This vigorous acid fermentation precluded any development of the residual spore-forming bacteria surviving the heat treatment.

The results for this series again demonstrate that commercially acceptable fermented vegetable products can be made in the absence of the acidification treatment, especially when highly viable, vigorous cultures of lactic acid bacteria are used as inocula. As stated earlier herein, the acidification treatment is essentially a safety precaution to guard against the possible development of undesirable aerobic and anaerobic, heat-resistant spores, prior to the onset of the acid fermentation by certain strains of lactic acid bacteria of low vigor and poor viability. In several hundred previous pure culture fermentations with brined cucumbers, using our cultures of lactic acid bacteria, we have been highly successful in obtaining complete control of microbial flora either with or without the acidification treatment. However, for the reasons stated above we desire to keep it a part of the basic procedure.

Other vegetables which may be brined and fermented by the pure culture process to give commercially acceptable products are: carrots; green tomatoes; green and/or wax snap beans (whole or cut); okra (whole or cut); onions (whole or sliced); West Indian gherkins; and a variety of sweet and/or hot peppers (cut, sliced or diced).

We claim:
1. A process for fermenting cucumbers in brine without decreasing the firmness thereof, comprising:
   (a) heat-shocking the cucumbers by bulk immersion in hot water maintained at 170° to 172° F. for an interval of time sufficient to achieve temperatures throughout the interior of the cucumbers within the range of 145° to 150° F., thereby to effect substantial destruction of asporogenous micro-organisms on the surface of the cucumbers and inactivate heat-labile enzyme systems of plant or microbial origin,
   (b) draining and packing the heat-shocked cucumbers in sanitized containers and covering them with a brine, previously heated to a temperature of about from 170° to 180° F. to destroy asporogenous micro-organisms and then cooled to about 40° to 45° F., said brine being of a strength to give an equilibrated concentration of salt of approximately 1.6% to 10% by weight,
   (c) inoculating each container of the heat-shocked, drained, packed, brined, and cooled cucumbers with a pure culture lactic acid fermentation-inducing micro-organism selected from the group consisting of Lactobacillus delbrueckii, Lactobacillus lactis, Lactobacillus plantarum, Lactobacillus thermophilus, Pediococcus cerevisiae, and Leuconostoc mesenteroides, said micro-organism being introduced in a quantity the order of magnitude of which is about 1,000,000,000 viable cells per quart of the packed and brined cucumbers, and
   (d) sealing with sanitized closures and incubating the containers of the cucumbers at a temperature favorable for the growth of the introduced pure culture micro-organism until the fermentation has progressed to completion.

2. The process of claim 1 wherein step (b) is followed by adding to said containers a sufficient quantity of food grade, edible acid to reduce the pH of the brine to about 4.6 to 4.2, thereby to inhibit the growth of any sporeforms that might have survived the heat-shocking treatment.

3. The process of claim 1 wherein the lactic acid fermentation-inducing micro-organism is Lactobacillus delbrueckii.

4. The process of claim 1 wherein the lactic acid fermentation-inducing micro-organism is Lactobacillus lactis.

5. The process of claim 1 wherein the lactic acid fermentation-inducing micro-organism is Lactobacillus plantarum.

6. The process of claim 1 wherein the lactic acid fermentation-inducing micro-organism is Lactobacillus thermophilus.

7. The process of claim 1 wherein the lactic acid fermentation-inducing micro-organism is Pediococcus cerevisiae.

8. The process of claim 1 wherein the lactic acid fermentation-inducing micro-organism is Leuconostoc mesenteroides.

9. A process for fermenting cucumbers in brine without decreasing the firmness thereof, comprising:
   (a) heat-shocking the cucumbers by bulk immersion in hot water maintained at 170° to 172° F. for an interval of time sufficient to achieve temperatures throughout the interior of the cucumbers within the range of 145° to 150° F., thereby to effect substantial destruction of asporogenous micro-organisms on the surface of the cucumbers and inactivate heat-labile enzyme systems of plant or microbial origin,
   (b) draining and packing the heat-shocked cucumbers in sanitized containers and covering them with a brine, previously heated to a temperature of about from 170° to 180° F. to destroy asporogenous micro-organisms and then cooled to about 40° to 45° F., said brine being of a strength to give an equilibrated concentration of salt of approximately 1.6% to 10% by weight,
   (c) inoculating each container of the heat-shocked, drained, packed, brined, and cooled cucumbers with a pure culture of a plurality of lactic acid fermentation-inducing micro-organisms selected from the group consisting of Lactobacillus delbrueckii, Lactobacillus lactis, Lactobacillus plantarum, Lactobacillus thermophilus, Pediococcus cerevisiae, and Leuconostoc mesenteroides, said micro-organisms being introduced in a quantity the order of magnitude of which is about 1,000,000,000 viable cells per quart of the packed and brined cucumbers, and
   (d) sealing with sanitized closures and incubating the containers of the cucumbers at a temperature favorable for the growth of the introduced pure culture micro-organisms until the fermentation has progressed to completion.

10. The process of claim 9 wherein Lactobacillus plantarum and Pediococcus cerevisiae are employed as the plurality of micro-organisms.

References Cited

UNITED STATES PATENTS
3,255,019    6/1966    Engelland _____ 99—156

OTHER REFERENCES
Wadsworth et al., "How To Use Lactic Acid in Finishing Pickles and Pickle Products," Food Industries, May 1939, pp. 252, 253, 291 and 292.

A. LOUIS MONACELL, *Primary Examiner.*

J. M. HUNTER, *Assistant Examiner.*